US006864893B2

(12) United States Patent
Zatz

(10) Patent No.: US 6,864,893 B2
(45) Date of Patent: Mar. 8, 2005

(54) METHOD AND APPARATUS FOR MODIFYING DEPTH VALUES USING PIXEL PROGRAMS

(75) Inventor: Harold Robert Feldman Zatz, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 153 days.

(21) Appl. No.: 10/302,464

(22) Filed: Nov. 22, 2002

(65) Prior Publication Data

US 2004/0012598 A1 Jan. 22, 2004

Related U.S. Application Data

(60) Provisional application No. 60/397,468, filed on Jul. 19, 2002.

(51) Int. Cl.[7] .......................... G06F 15/16; G06T 15/40
(52) U.S. Cl. ...................... 345/503; 345/422; 345/606; 345/614; 345/620; 345/506
(58) Field of Search ................................. 345/419, 422, 345/426, 582, 585, 586, 587, 606, 614, 620, 503, 520, 545, 552, 559, 506

(56) References Cited

U.S. PATENT DOCUMENTS

| 6,025,853 | A | * | 2/2000 | Baldwin ...................... 345/506 |
| 6,587,114 | B1 | * | 7/2003 | Peercy et al. ................ 345/582 |
| 6,618,048 | B1 | * | 9/2003 | Leather ........................ 345/422 |
| 6,664,958 | B1 | * | 12/2003 | Leather et al. .............. 345/422 |
| 2003/0067468 | A1 | * | 4/2003 | Duluk et al. ................ 345/506 |
| 2003/0067473 | A1 | * | 4/2003 | Taylor et al. ................ 345/561 |

OTHER PUBLICATIONS

Proudfoot, K., Mark, W., Tzvetkov, S., and Hanrahan, P., "A Real–Time Procedural Shading System for Programmable Graphic Hardware", ACM SIGGRAPH 2001, pp. 159–170.*

Lastra, A., Molnar, S., Olano, M., and Wang, Y., "Real–Time Programmable Shading", 1995 Symposium on Interactive 3D Graphics, pp. 59–66.*

Introduction to Shader Programming—Fundamentals of Vertex Shaders by Wolfgang Engel, modified Feb. 27, 2002; GameDev.net; http://www.gamedev.net/reference/articles/article1496.asp.

Shader Programming—Part III: Fundamentals of Pixel Shaders by Wolfgang Engel; GameDev.net; http://www-.gamedev.net/columns/hardcore/dxshader3.

Introduction to Shader Programming—Part IV: Programming Pixel Shaders by Wolfgang F. Engel; modified Jun. 8, 2002; GameDev.net; http://www.gamedev.net/reference/articles/article1837.asp.

* cited by examiner

Primary Examiner—Ulka J. Chauhan
(74) Attorney, Agent, or Firm—Moser, Patterson & Sheridan LLP

(57) ABSTRACT

A method and apparatus for generating depth values in a programmable graphics system. Depth values are calculated under control of a pixel program using a variety of sources as inputs to programmable computation units (PCUs) in the programmable graphics systems. The PCUs are used to compute traditional interpolated depth values and modified depth values. Th PCUs are also used to compute arbitrary depth values which, unlike traditional interpolated depth values and modified depth values, are not dependent on the coordinates of the geometry primitive with which the arbitrary depth values are associated. Several sources are available as inputs to the PCUs. Clipping with optional clamping is performed using either interpolated depth values or calculated depth values, where calculated depth values are arbitrary depth values or modified depth values. Final depth values, used for depth testing, are selected from interpolated depth values and arbitrary depth values after clipping is performed.

19 Claims, 5 Drawing Sheets

METHOD AND APPARATUS FOR MODIFYING DEPTH VALUES USING PIXEL PROGRAMS

CROSS-REFERENCE TO RELATED APPLICATIONS

This application claims priority from commonly owned U.S. patent application No. 60/397,468 entitled "Method and Apparatus for Modifying Depth Values Using Pixel Programs" filed Jul. 19, 2002 that is incorporated herein by reference.

BACKGROUND

1. Field of the Invention

The invention is in the field of computer graphics, and more particularly to calculating depth values in a graphics pipeline.

2. Description of the Related Art

Recent advances in graphics processors permit users to program graphics pipeline units using fragment or pixel programs to implement a variety of user defined shading algorithms. Traditionally, a graphics processor calculated an interpolated depth value for each pixel dependent on x and y coordinates of a geometry primitive, e.g., triangle or polygon that the interpolated depth value was associated with. The interpolated depth value was passed through the graphics pipeline, pixels were clipped by discarding the pixels whose interpolated depth value was outside of the space between the near and far clipping planes, and the retained pixel depth values were used during the depth test.

A desire for greater flexibility in computations has resulted in modifications in the traditional graphics processor to permit the calculation not only of the traditional interpolated depth values, but also to perform further calculations based on the interpolated depth values to generate modified depth values. As illustrated in FIG. 1, a Graphics Subsystem 120 calculates traditional interpolated depth values in a Rasterizer 150. The interpolated depth values are pipelined through a Texturer 155 to a Pixel Unit 160. The interpolated depth values are used to compute modified depth values in Pixel Unit 160. The modified depth values are received by a Raster Operation Unit 165 that clips the pixels associated with the depth values and performs the depth test operation.

At least one application programming interface (API), OpenGL® API 1.3, prefers that clipping be performed using interpolated depth values rather than modified depth values, even when modified depth values are generated. However, when Pixel Unit 160 outputs modified depth values it is not possible for a unit downstream in the pipeline, such as the Raster Operation Unit 165, to clip pixels using the interpolated depth values. It is also not possible to recalculate the interpolated depth values because the inputs needed for the interpolation calculation are not available to Raster Operation Unit 165. However, some pixel programs do clip pixels using the modified depth values. Therefore it is still desirable to compute modified depth values and then clip using either modified depth values or interpolated depth values.

Further, the interpolated depth values and the modified depth values are both typically computed dependent on the coordinates of the geometry primitive. However, there is a desire to implement pixel programs that compute depth values that are independent of the coordinates of the geometry primitive, such as depth values read from memory using map indices u and v.

For the foregoing reasons, there is a need for a graphics system that can generate not only interpolated depth values and modified depth values, but also arbitrary depth values that are independent of the coordinates of a geometry primitive. Furthermore, there is a need for a graphics system that can clip pixels using either calculated depth values or interpolated depth values, where calculated depth values are either modified depth values or arbitrary values, and select between interpolated depth values and calculated depth values to determine the final depth values for depth testing.

SUMMARY

The present invention is directed to an system and method that satisfies the need for a programmable graphics system that can generate the calculated depth values and the interpolated depth values, clip and optionally clamp pixel values using either the calculated pixel depth values or interpolated pixel depth values, and select between interpolated pixel depth values and calculated pixel depth values to generate final pixel depth values for depth testing.

Various embodiments of the invention include a programmable fragment processing pipeline comprising a local register file and a programmable computation unit. The programmable computation unit comprises one or more arithmetic units, under control of a pixel program, and a write interface. The programmable computation unit is configured to select, under the control of a pixel program, one or more inputs to the one or more arithmetic units from a plurality of sources. The one or more arithmetic units use the selected one or more inputs to compute the calculated pixel depth value that is associated with a geometry primitive pixel and independent of the coordinates of the geometry primitive. The calculated pixel depth value is optionally written to the local register file. Additionally, the invention can include a host processor, a host memory, and a system interface configured to interface with the host processor.

Furthermore, the one or more arithmetic units are configured to compute the interpolated pixel depth value associated with a geometry primitive pixel and dependent on the coordinates of the geometry primitive. Still further, an interpolated pixel depth value is computed using a programmable depth computation unit. A selector is configured, under the control of a pixel program, to select either the interpolated pixel depth value computed by the programmable depth computation unit or the calculated pixel depth value as the final pixel depth value. The plurality of sources includes a graphics memory, a host memory, and an other programmable computation unit in the programmable fragment processing pipeline.

An embodiment of the programmable fragment processing pipeline includes a first clipping unit configured to clip and optionally clamp a pixel associated with the interpolated pixel depth value. The programmable fragment processing pipeline also includes a second clipping unit configured to clip and optionally clamp a pixel associated with the final pixel depth value.

An embodiment of the present invention includes a method of calculating a pixel depth value comprising selecting inputs for a depth calculation from a plurality of sources, computing a calculated pixel depth value, and writing the calculated pixel depth value to a local register file, where the selecting, computing, and writing are performed under control of a pixel program. The calculated pixel depth value is associated with a geometry primitive pixel and independent of the coordinates of the geometry primitive. Additionally, the method can use a computing system including a programmable fragment processing pipeline to calculate the pixel depth value.

Furthermore, the method can include calculation of a first interpolated pixel depth value that is associated with a geometry primitive pixel and dependent on the coordinates of the geometry primitive. The method can include selection, under control of the pixel program, between the first interpolated pixel depth value and calculated pixel depth value, generating a final pixel depth value. The method can further include computing, under control of the pixel program, a second interpolated pixel depth value that is the same as the first interpolated pixel depth value. The plurality of sources includes a graphics memory, a host memory, and an other programmable computation unit in the programmable fragment processing pipeline.

Still further, the method can include clipping and optionally clamping a pixel associated with the interpolated pixel depth value. Yet further, the method can include clipping and optionally clamping a pixel associated with the final pixel depth value.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DESCRIPTION

The current invention involves new systems and methods for processing and generating depth values in a programmable shader pipeline. These systems and methods satisfy the need for a graphics system that can generate the calculated depth values and the interpolated depth values, clip pixels using either the calculated depth values or interpolated depth values, and select between interpolated depth values and calculated depth values to determine final depth values for depth testing.

Figure 1:
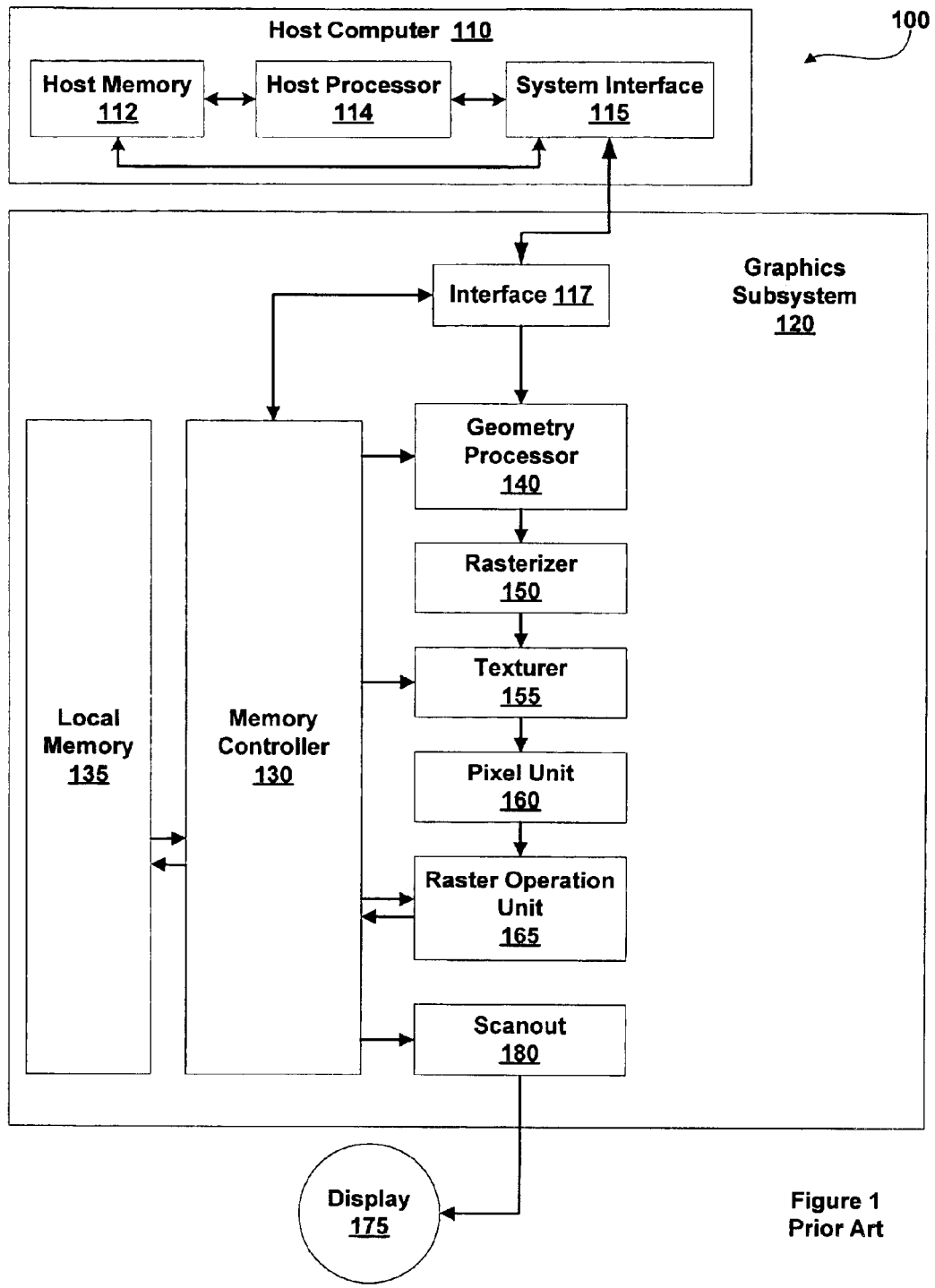
FIG. 1 is a block diagram illustrating a prior art general computing system including a graphics subsystem.
Figure 2:
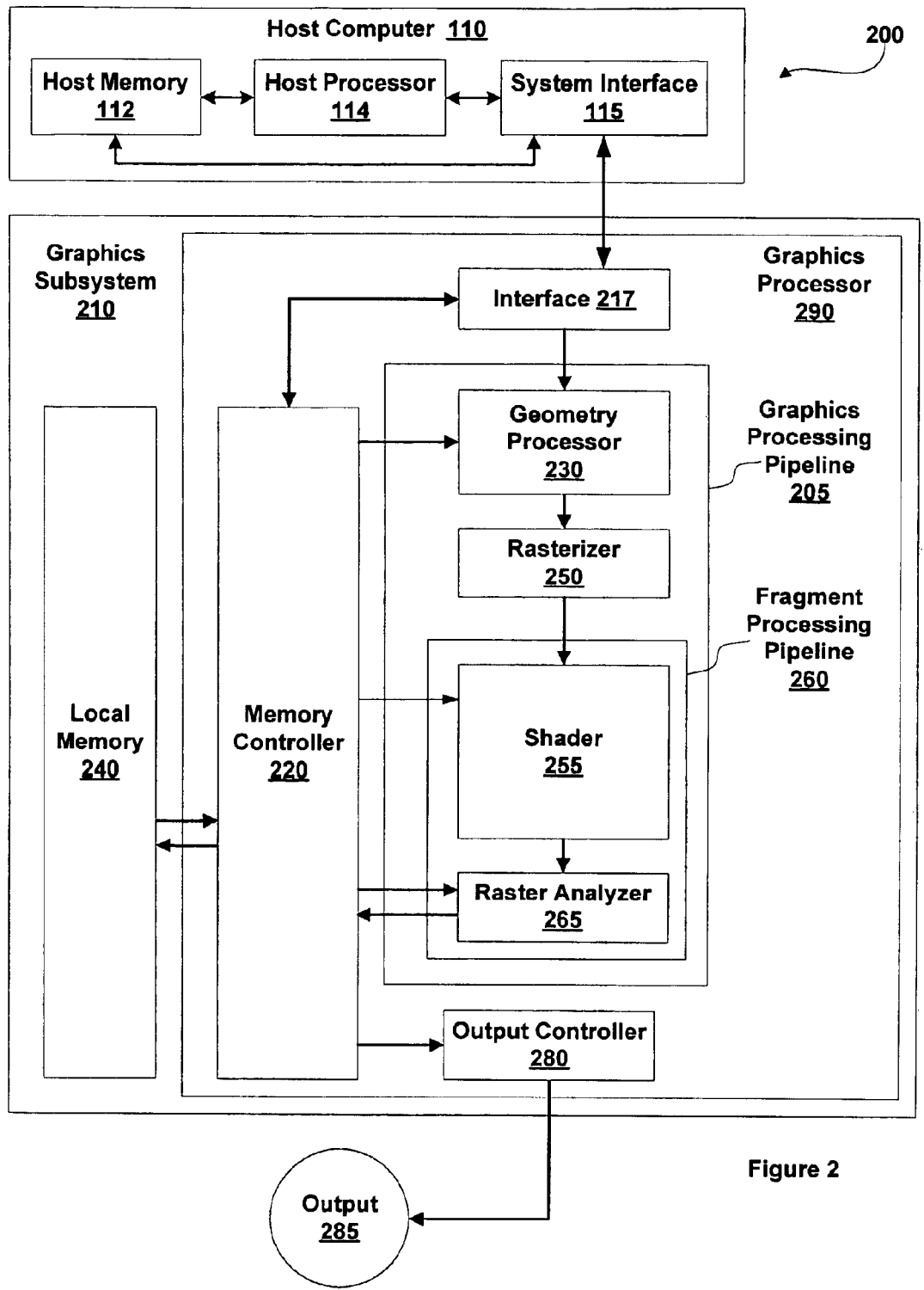
FIG. 2 illustrates one embodiment of a computing system according to the invention including a host computer and a graphics subsystem.

FIG. 2 is an illustration of a Computing System generally designated 200 and including a Host Computer 110 and a Graphics Subsystem 210. Computing System 200 may be a desktop computer, server, laptop computer, palm-sized computer, tablet computer, game console, cellular telephone, computer based simulator, or the like. Host Computer 110 includes Host Processor 114 which may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Host Computer 110 communicates with Graphics Subsystem 210 via System Interface 115 and an Interface 217. Data received at Interface 217 can be passed to a Geometry Processor 230 or written to a Local Memory 240 through Memory Controller 220. Memory Controller 220 is configured to handle data sizes from typically 8 to more than 128 bits.

A Graphics Processing Pipeline 205 includes, among other components, Geometry Processor 230 and a Fragment Processing Pipeline 260 that each contain one or more programmable graphics processing units to perform a variety of specialized functions. Some of these functions are table lookup, scalar and vector addition, multiplication, division, coordinate-system mapping, calculation of vector normals, tessellation, calculation of derivatives, interpolation, and the like. Geometry Processor 230 and Fragment Processing Pipeline 260 are optionally configured such that data processing operations are performed in multiple passes through Graphics Processing Pipeline 205 or in multiple passes through Fragment Processing Pipeline 260. Shader programs and pixel programs are sequences of program instructions compiled for execution within Fragment Processing Pipeline 260. Data generated under control of a program in one pass and written to Local Memory 240 or Host Memory 112, e.g., a texture map, can be accessed in a subsequent pass. Alternatively, the data written to Local Memory 240 or Host Memory 112 can be optionally processed and used as indices to access map data, such as a texture map, stored in Local Memory 240 or Host Memory 112. Furthermore, a Shader 255, within Fragment Processing Pipeline 260, is optionally configured using the pixel programs such that data processing operations are performed in multiple passes within Shader 255. It should be understood that the program instructions and data can be read from or written to memory, e.g., any combination of Local Memory 240 and Host Memory 112.

Geometry Processor 230 receives a stream of program instructions and data and performs vector floating-point operations or other processing operations. Processed data is passed from Geometry Processor 230 to a Rasterizer 250. In a typical implementation Rasterizer 250 performs scan conversion and outputs fragment, pixel, or sample data and program instructions to Fragment Processing Pipeline 260. For simplicity, the remainder of this description will use the term pixels to refer to pixels, samples and/or fragments.

Data processed by Shader 255 is passed to a Raster Analyzer 265, which performs operations similar to prior art Raster Operation Unit 165 and saves the results in Local Memory 240 or a Host Memory 112. Raster Analyzer 265 includes a read interface and a write interface to Memory Controller 220 through which Raster Analyzer 265 accesses data, including pixel depth values, stored in Local Memory 240 or Host Memory 112.

When processing is completed, an Output 285 of Graphics Subsystem 210 is provided using an Output Controller 280. Output Controller 280 is optionally configured to deliver data to a display device, network, electronic control system, other Computing System 200, other Graphics Subsystem 210, or the like.

Figure 3:
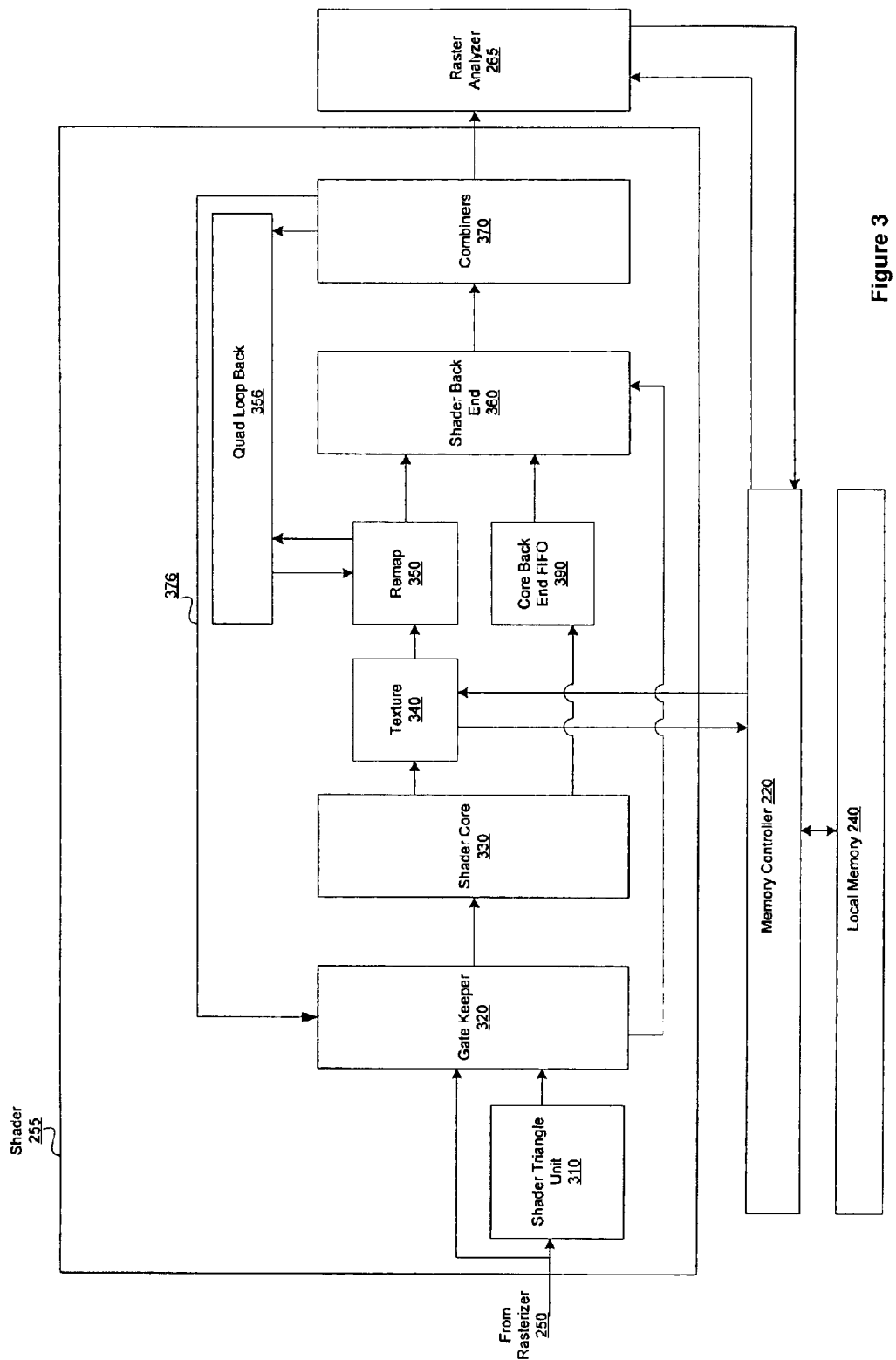
FIG. 3 is a block diagram of an embodiment of the Shader of FIG. 2.

FIG. 3 is a block diagram of Fragment Processing Pipeline 260 including programmable graphics processing units Shader 255 and Raster Analyzer 265. Shader 255 and Raster Analyzer 265 use program instructions to process graphics data as described further herein. The program instructions and graphics data are stored in graphics memory, e.g., Local Memory 240 and storage resources within Fragment Processing Pipeline 260 such as register files, and the like.

A Shader Triangle Unit 310 calculates the plane equations for texture coordinates, depth, and other parameters. A Gate Keeper 320 performs a multiplexing function, selecting between the pipeline data from Rasterizer 250 and Shader Triangle Unit 310 and a Feedback Output 376 of a Combiners 370. Shader Core 330 initiates Local Memory 240 read requests via Texture 340 that are processed by Memory Controller 220 to read data, such as map data (e.g., height field, bump, texture, etc.) and program instructions. Shader Core 330 also performs floating point computations such as triangle parameter interpolation and reciprocals and is optionally programmed to compute the interpolated pixel depth values. Pixel data processed by Shader Core 330 is optionally input to a Core Back End FIFO (first in first out) 390. Even when interpolated pixel depth values are computed in Shader Core 330, interpolated pixel depth values are not necessarily output to Core Back End FIFO 390. Instead plane equation data needed to compute interpolated pixel depth values is output to Core Back End FIFO 390 and interpolated pixel depth values are recomputed by a Shader Back End 360, as described further herein, because plane equation data requires fewer pipeline storage resources than interpolated pixel depth values. Futhermore, in an alternate embodiment Core Back End FIFO 390 is implemented as a register file that is written by Shader Core 330 and read by Shader Back End 360.

Data read by Shader Core 330 via Memory Controller 220 is returned to a Texture 340. Texture 340 unpacks the read data and outputs unpacked data to a Remap 350. Remap 350 interprets any program instructions included in the unpacked data and generates codewords which control the processing completed by the graphics processing units in Fragment Processing Pipeline 260. When multi-pass operations are being performed within Shader 255, Remap 350 also reads the data fed back from Combiners 370 via a Quad Loop Back 356, synchronizing the fed back data with the unpacked data received from Texture 340, as explained more fully herein. Remap 350 formats the unpacked data and fed back data, outputting codewords and formatted data to Shader Back End 360.

Shader Back End 360 also receives pixel component data from Shader Core 330 via Core Back End FIFO 390 and triangle data, such as plane equations, from Gate Keeper 320. Shader Back End 360 synchronizes pixel component data and triangle data with formatted data from Remap 350. Shader Back End 360 performs computations using the input data (formatted data, pixel component data and triangle data) based on codewords received from Remap 350. Specifically, Shader Back End 360 computes interpolated pixel depth values using plane equation data from Shader Triangle Unit 310 via Gate Keeper 320 and pixel component data written to Core Back End FIFO 390 by Shader Core 330. Those computed interpolated pixel depth values computed in Shader Back End 360 are the same, pixel for pixel, as interpolated pixel depth values optionally computed in Shader Core 330. Therefore, pipeline storage resources required to pass interpolated pixel depth values from Shader Core 330 to Shader Back End 360 are not needed and the interpolated pixel depth values are as accurate as those computed in Shader Core 330. In Shader Back End 360, interpolated pixel depth values are used to clip the pixel values associated with each interpolated depth value. The clipped pixel values are optionally clamped to valid x and y coordinates to avoid discarding a partially clipped pixel that is slightly outside of the clip space due to the precision of the interpolation computation. Shader Back End 360 optionally computes calculated pixel depth values using formatted data containing read map data and/or read fed back data. Finally, Shader Back End 360 uses a multiplexor to select between interpolated pixel depth values and calculated pixel depth values, choosing final pixel depth values for output as part of a stream also including codewords and shaded pixel data.

The output of Shader Back End 360 is input to Combiners 370 where codewords are executed by the programmable combiner computation units within Combiners 370. Combiners 370 are typically used to perform arithmetic computations using two or more inputs received from Shader Back End 360 to generate combined pixel data. Arithmetic computations include dot products, multiplication, and addition, among others. The codewords executing in the current pass control whether the combined pixel data will be fed back within Shader 255, using one or both of the paths, to be processed in a subsequent pass. Using a first path, Combiners 370 optionally output codewords, to be executed by Shader Core 330 and Texture 340 in a subsequent pass, to Gate Keeper 320 using feedback path 376. Using a second path, Combiners 370 also optionally output combined pixel data to local register file Quad Loop Back 356, to be read by Remap 350 in a subsequent pass. Finally, Combiners 370 optionally output combined pixel data, e.g., x, y, color, depth, other parameters, to Raster Analyzer 265. Raster Analyzer 265 performs near and far plane clipping and raster operations, such as stencil, z test, etc., using the combined pixel data and pixel data stored in Local Memory 240 or Host Memory 112 at the x,y location associated with the combined pixel data. The output data from Raster Analyzer 265 is written back to Local Memory 240 or Host Memory 112 via Memory Controller 220 at the x,y locations associated with the output data. The output data is represented in one or more formats as specified by the codewords. For example, color data is written as 16 or 32 bit per pixel ARGB to be scanned out for display or used as a texture map by a pixel program executed in a subsequent pass within Fragment Processing Pipeline 260 or through Graphics Processing Pipeline 205. Alternatively, color and depth data is written, and later read and processed by Raster Analyzer 265 to generate output data prior to being scanned out for display via Output Controller 280.

Figure 4:
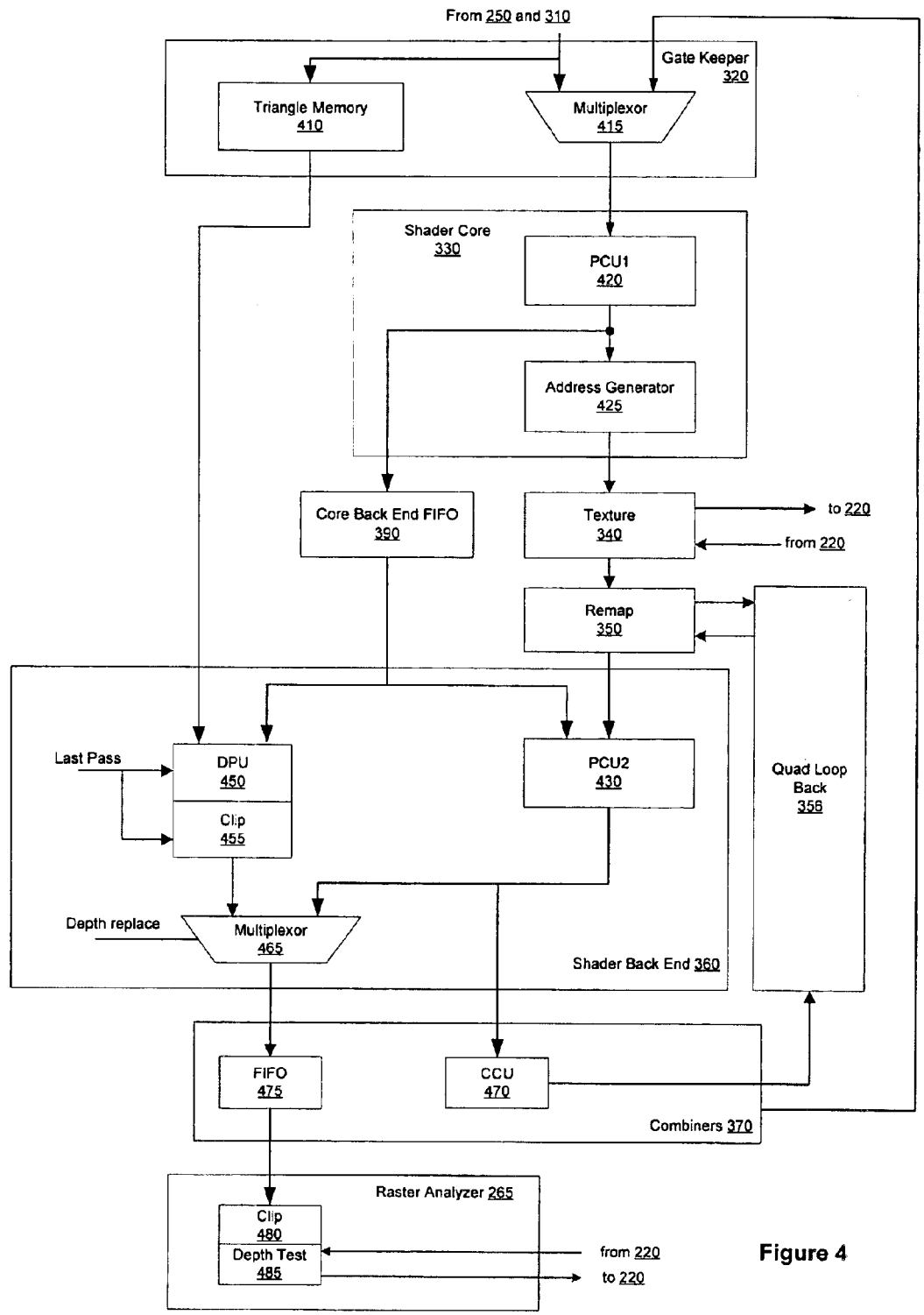
FIG. 4 is a block diagram of the units which process depth in an embodiment of the Shader Core of FIG. 3.

FIG. 4 is a block diagram of the elements of Shader 255 and Raster Analyzer 265 that are used to generate or process pixel depth values. Therefore, the block diagram is only a partial representation of Shader 255 and Raster Analyzer 265. The functions of the different elements are explained with reference to the flowchart of FIG. 5.

Figure 5:
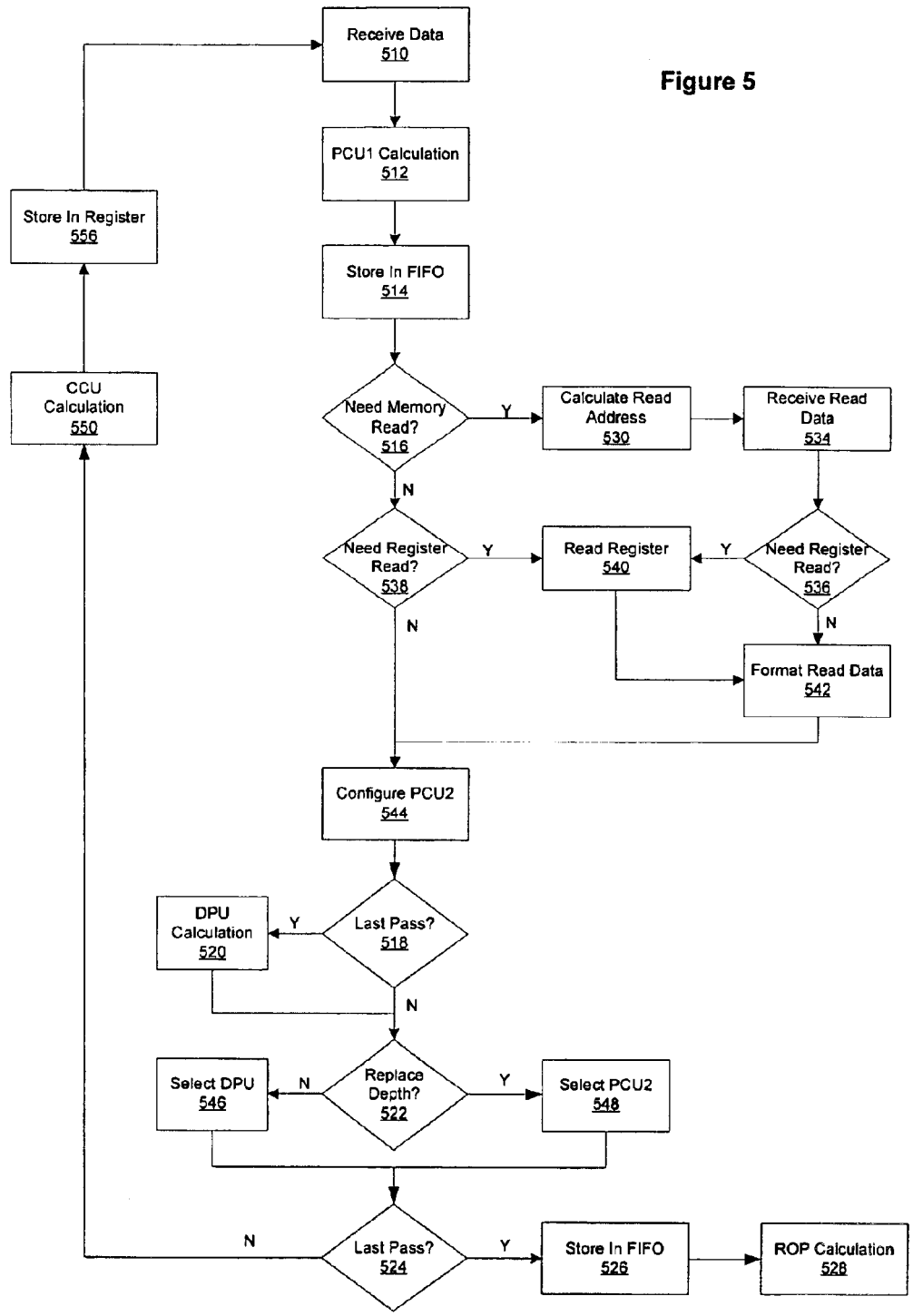
FIG. 5 is a flowchart illustrating the processing of pixel programs by the units shown FIG. 4.

FIG. 5 is a flowchart representing one method of the invention for generating or processing depth values using the programmable graphics shader of the invention. The interpolated depth value computed using the geometric data for a primitive, e.g., triangle, is calculated in Shader 255 by following the sequence of steps in Example 1 described below. In Example 1, the final depth value, optionally written back to Local Memory 240 via Memory Controller 220, is interpolated depth.

EXAMPLE 1

In step 510, Gate Keeper 320 receives pixel data, triangle data, and codewords from Rasterizer 250 and Shader Triangle Unit 310. Gate Keeper 320 stores triangle data, including depth plane equation data, in Triangle Memory 410 and outputs pixel data and codewords to Shader Core 330 via Multiplexor 415. In step 512, Shader Core 330 configures the Programmable Computation Unit (PCU), PCU1 420, according to the codewords, to generate pixel output data based on data received from Gate Keeper 320. Per pixel interpolated depth values are optionally computed using PCU1 420 to evaluate plane equations. In an alternate embodiment one or more additional PCUs are included in Shader Core 330 such that pixel texture coordinates, pixel parameter values, per pixel interpolated depth values, and the like, are computed in parallel. PCU1 420 includes arithmetic subunits, logic for selection of inputs to the arithmetic subunits, and interface logic to write register files or FIFOs. The interface logic generates the write address and write control signals based on the protocol required by a register file or FIFO.

In step 514, Shader Core 330 writes per pixel components to Core Back End FIFO 390. Data stored in Core Back End FIFO 390 is used as source data in the current pass through Shader 255 or alternatively, in a subsequent pass. Per pixel interpolated depth values computed by PCU1 420 are effectively discarded because per pixel interpolated depth values are not written to Core Back End FIFO 390. In step 516, Shader Core 330 uses the codewords to determine whether map data or program instructions to be executed at a later time are required to be read from Local Memory 240. The codewords are passed from Shader Core 330 through Texture 340 to Remap 350. If the program instructions are required to be read from Local Memory 240, in step 530, Shader Core 330 calculates the read addresses in Address Generator 425 and outputs a read request to Memory Controller 220. In step 534, read program instructions return to Texture 340 and are unpacked. In step 536, Remap 350 receives and processes the unpacked program instructions, generates codewords, and determines whether source data is required to be read from Quad Loop Back 356, and, if not, in step 542, Remap 350 outputs codewords to Shader Back End 360. In this example, in step 544, codewords received by Shader Back End 360 configure programmable computation unit, PCU2 430, to be idle rather than perform a computation because there is no source input data for PCU2 430 to process. Then, in step 518 Shader Back End 360 uses the codewords to determine whether this is the last pass of the data through Shader 255 and, if so, in step 520, Shader Back End 360 reads per pixel components from Core Back End FIFO 390 and depth plane equation data from Triangle Memory 410 to compute interpolated pixel depth values using a Depth Processing Unit (DPU) 450. Interpolated pixel depth values are used by a Clip 455 to clip pixels using near and far clipping planes. Clipped pixel values are optionally clamped to valid x and y coordinates to avoid discarding a partially clipped pixel that is slightly outside of the clip space due to the precision of the interpolation computation. Similar to the PCU1 420, DPU 450 functionality is not limited to interpolation computations.

In step 522, Shader Back End 360 determines if "depth replace" is enabled according to the codewords and, if not, in step 546, Multiplexor 465 selects DPU 450 computed interpolated and clipped pixel depth values as final pixel depth values that are output from Shader Back End 360. In an alternate embodiment the selection function is performed using combinatorial logic, a lookup table, or the like. In step 524, Combiners 370 uses the codewords to determine whether this is the last pass of the data through Shader 255 and, if so, in step 526, Combiners 370 input final pixel depth values into a Depth FIFO 475 that are later output to Raster Analyzer 265. In step 528, Raster Analyzer 265 receives final pixel depth values from Combiners 370 and performs near and far plane clipping with optional clamping. Raster Analyzer 265 optionally reads, via Memory Controller 220, pixel depth values stored in Local Memory 240 corresponding to pixel (x, y) locations for final pixel depth values. Raster Analyzer 265 optionally performs a depth test function using read pixel depth values and final pixel depth values as specified by the codewords and generates a pass or fail result. If the depth test passes, final depth is written back to Local Memory 240 via Memory Controller 220. If the depth test fails the final depth is discarded. In this example, final depth is clipped interpolated pixel depth.

In Example 2, a calculated depth value is computed and used as final pixel depth in Shader 255 by following the sequence of steps described below. Source data used to calculate pixel depth values is stored in Local Memory 240 as a map and is accessed using u and v indices associated with specific geometric locations. In this example, the map data is an array of depth values that are processed in the same manner as texture map data is processed, e.g., trilinearly interpolated. The map data is independent of the vertex coordinates x, y, and z. Therefore, unlike final pixel depth values in Example 1, final pixel depth values in Example 2 are independent of the coordinates of the geometry primitive.

EXAMPLE 2

In step 510, Gate Keeper 320 receives pixel data, triangle data, and codewords from Rasterizer 250 and Shader Triangle Unit 310. Gate Keeper 320 stores triangle data, including depth plane equation data, in Triangle Memory 410 and outputs pixel data and codewords to Shader Core 330 via Multiplexor 415. In step 512, Shader Core 330 configures PCU1 420 according to the codewords to generate pixel output data based on data received from Gate Keeper 320. Per pixel interpolated depth values are optionally computed using PCU1 420 to evaluate plane equations. In step 514, Shader Core 330 writes per pixel components to Core Back End FIFO 390.

In step 516, Shader Core 330 uses the codewords to determine whether map data or program instructions to be executed at a later time are required to be read from local memory. The codewords are passed from Shader Core 330 through Texture 340 to Remap 350. If map data or program instructions to be executed at a later time are required to be read from Local Memory 240, in step 530, Shader Core 330 calculates read addresses in Address Generator 425 and outputs read requests to Memory Controller 220 via Texture 340. In step 534, read depth map data values and read program instructions return to Texture 340 and are unpacked. In step 536, Remap 350 receives and processes the unpacked program instructions, generates codewords, and determines whether source data is required to be read from Quad Loop Back 356. If the source data stored in Quad Loop Back 356 is not required to be read, in step 542 Remap 350 format converts unpacked depth map data received from Texture 340 and outputs format converted depth data and codewords to Shader Back End 360. In step 544, codewords received by Shader Back End 360 configure PCU2 430 to perform trilinear interpolation using the format converted depth data. In step 518, Shader Back End 360 uses the codewords to determine whether this is the last pass of the data through Shader 255, and, if so, in Step 520 Shader Back End 360 reads per pixel components from Core Back End FIFO 390 and triangle data from Triangle Memory 410 and computes interpolated pixel depth values using DPU 450. Interpolated pixel depth values are used by Clip 455 to clip pixels using near and far clipping planes and optionally clamp clipped pixel values to avoid discarding a partially clipped pixel.

In step 522, Shader Back End 360 determines if "depth replace" is enabled according to the codewords and, if so, in step 548 Multiplexor 465 selects PCU2 430 trilinearly interpolated pixel depth values as final pixel depth values to be output from Shader Back End 360 to Combiners 370. In step 524, Combiners 370 uses the codewords to determine whether this is the last pass of the data through Shader 255 and, if so, in step 526 Combiners 370 input final pixel depth values into a Depth FIFO 475 that are later output to Raster Analyzer 265. In step 528, Raster Analyzer 265 receives final pixel depth values from Combiners 370 and performs near and far plane clipping with optional clamping. Raster Analyzer 265 optionally reads pixel depth values stored in Local Memory 240 corresponding to pixel (x, y) locations for final pixel depth values. Raster Analyzer 265 optionally performs a depth test function using read pixel depth values and final pixel depth values as specified by the codewords and generates a pass or fail result. If the depth test passes, final depth is written back to Local Memory 240 via Memory Controller 220. If the depth test fails the final depth is discarded. In this example, final depth is PCU2 430 calculated pixel depth that was generated independent from the corresponding interpolated depth value computed using the coordinates of the geometry primitive.

In Example 3, two calculated pixel depth values are computed and combined to output a new depth value in Shader 255 by following the sequence of steps described below. As a result of the independent paths and programmable configuration of Shader 255, programming Shader 255 in the configuration in this combination permits displacements read from a map stored in Local Memory 240 to be applied to interpolated pixel depth values calculated in Shader Core 320.

EXAMPLE 3

In step 510, Gate Keeper 320 receives pixel data, triangle data, and codewords from Rasterizer 250 and Shader Triangle Unit 310. Gate Keeper 320 stores triangle data, including depth plane equation data, in Triangle Memory 410 and outputs pixel data and codewords to Shader Core 330. In step 512, Shader Core 330 configures PCU1 420 according to the codewords to generate pixel output data based on data received from Gate Keeper 320. Per pixel interpolated depth values are optionally computed using PCU1 420 to evaluate plane equations. In step 514, Shader Core 330 writes per pixel interpolated depth values to Core Back End FIFO 390 to be used as source data in the current pass through Shader 255.

In step 516, Shader Core 330 uses codewords to determine whether map data or program instructions to be executed at a later time are required to be read from Local Memory 240. The codewords are passed from Shader Core 330 through Texture 340 to Remap 350. If the map data or program instructions to be executed at a later time are required to be read from Local Memory 240, in step 530 Shader Core 330 calculates the read addresses in Address Generator 425 and outputs read requests to Memory Controller 220. In step 534, read depth map data values and read program instructions return to Texture 340 and are unpacked. In step 536, Remap 350 receives and processes the unpacked program instructions, generates codewords, and determines whether source data is required to be read from Quad Loop Back 356. If the source data stored in Quad Loop Back 356 is not required to be read, in step 542 Remap 350 format converts unpacked depth map data received from Texture 340. The format converted depth data and codewords are output by Remap 350 to Shader Back End 360. In step 544, Shader Back End 360 configures PCU2 430 according to the codewords to perform a computation. Interpolated pixel depth values calculated using PCU1 420 in Shader Core 330 and stored in Core Back End FIFO 390 are also input to Shader Back End 360 and both depth values are processed by PCU2 430. In this example, PCU2 430 is configured to use format converted depth values as displacements and modify interpolated pixel depth values to compute displaced pixel depth values. Alternatively, PCU1 420 computed interpolated pixel depth values are combined with format converted depth values using PCU2 430.

In step 518, Shader Back End 360 uses the codewords to determine whether this is the last pass of the data through Shader 255, and, if so, in Step 520 Shader Back End 360 reads per pixel components from Core Back End FIFO 390 and triangle data from Triangle Memory 410 and computes interpolated pixel depth values using DPU 450. Interpolated pixel depth values are used by Clip 455 to clip pixels using near and far clipping planes and optionally clamp clipped pixel values to avoid discarding a partially clipped pixel.

In step 522, Shader Back End 360 determines if "depth replace" is enabled according to the codewords and, if so, in step 548 Multiplexor 465 selects PCU2 430 calculated displaced pixel depth values as final pixel depth values to be output from Shader Back End 360 to Combiners 370. In step 524, Combiners 370 uses the codewords to determine whether this is the last pass of the data through Shader 255 and, if so, in step 526 Combiners 370 input final pixel depth values into Depth FIFO 475 that are later output to Raster Analyzer 265. In step 528, Raster Analyzer 265 receives final pixel depth values from Combiners 370 and performs near and far plane clipping with optional clamping. Raster Analyzer 265 optionally reads pixel depth values stored in Local Memory 240 corresponding to the pixel (x, y) locations for final pixel depth values. Raster Analyzer 265 optionally performs a depth test function using read pixel depth values and final pixel depth values as specified by the codewords and generates a pass or fail result. If the depth test passes, final depth is written back to Local Memory via Memory Controller. If the depth test fails the final depth is discarded. In this example, final depth is displaced depth that was generated using interpolated pixel depth values computed from the coordinates of the geometry primitive and map data representing depth displacements.

In Example 4 pixel depth values are computed in two passes through Shader 255 to output a new pixel depth value following the sequence of steps described below. Programming Shader 255 in the configuration in this combination permits values computed during a first pass to be used to calculate depth values in Shader Back End 360 during a second pass. In this example, depth displacements are computed during the first pass and the displacements are applied to interpolated pixel depth values during the second pass.

EXAMPLE 4

In step 510, Gate Keeper 320 receives pixel data, triangle data, and codewords from Rasterizer 250 and Shader Triangle Unit 310. Gate Keeper 320 stores triangle data, including depth plane equation data, in Triangle Memory 410 and outputs pixel data and codewords to Shader Core 330. In step 512, Shader Core 330 configures PCU1 420 according to codewords and computes depth displacements based on data received from Gate Keeper 320. In step 514, Shader Core 330 writes per pixel depth displacements to Core Back End FIFO 390 to be used as source data in the second pass through Shader 255.

In step 516, Shader Core 330 uses codewords to determine whether map data or program instructions to be executed at a later time are required to be read from Local Memory 240. The codewords are passed from Shader Core 330 through Texture 340 to Remap 350. If the map data or program instructions to be executed at a later time are not required to be read from Local Memory 240, in step 538 Remap 350 determines whether source data is required to be read from Quad Loop Back 356. If the map source data is not required to be read from Quad Loop Back 356 Remap 350 outputs codewords to Shader Back End 360. In step 544, Shader Back End 360 configures PCU2 430 according to codewords to pass the data input to PCU2 430 through to the output of PCU2 430. In this example per pixel depth displacements calculated using PCU1 420 in Shader Core 330 and stored in Core Back End FIFO 390 are passed through PCU2 430. Alternatively, PCU2 430 is configured to compute modified pixel depth displacements using source inputs such as read map data or pixel components read from Core Back End FIFO 390.

In step 518, Shader Back End 360 uses the codewords to determine whether this is the last pass of the data through Shader 255 and, if not, in step 522 Shader Back End 360 determines if "depth replace" is enabled according to the codewords. If "depth replace" is enabled, in step 548 Multiplexor 465 selects PCU2 430 calculated data and outputs it to Combiners 370. In step 524, Combiners 370 uses the codewords to determine whether this is the last pass of the data through Shader 255, and, if not, in step 550 Combiners input PCU2 430 processed data output from Shader Back End 360 into combiner computation unit, CCU 470, and feeds the output of CCU 470 into Gate Keeper 320. Codewords generated from program instructions and data that were each optionally read from Local Memory 240 are output by Combiners 370 to Gatekeeper 320.

Example 4 continues with step 510, where Gate Keeper 320 receives CCU 470 processed data and synchronizes it with pixel data from Rasterizer 250 and triangle data from Shader Triangle Unit 310 using Multiplexor 415 to output data received from each source as directed by codewords. In step 512, Shader Core 330 configures PCU1 420 according to codewords and computes interpolated pixel depth values based on data received from Gate Keeper 320. In step 514, Shader Core 330 writes per pixel interpolated depth values to Core Back End FIFO 390 to be used as source data in the current pass through Shader 255.

In step 516, Shader Core 330 uses codewords to determine whether map data or program instructions to be executed at a later time are required to be read from Local Memory 240. The codewords are passed from Shader Core 330 through Texture 340 to Remap 350. If the map data or program instructions to be executed at a later time are not required to be read from Local Memory 240, in step 538 Remap 350 determines whether source data is required to be read from Quad Loop Back 356. If the source data stored in Quad Loop Back 356 is required to be read, in step 540 Remap 350 generates a read request for Quad Loop Back 356. In step 540, depth displacements calculated during the first pass are received from Quad Loop Back 356 by Remap 350 and in step 542 Remap 350 format converts depth displacements. The format converted depth displacements and codewords are output by Remap 350 to Shader Back End 360. In step 544, Shader Back End 360 configures PCU2 430 according to codewords to perform a computation. Interpolated pixel depth values calculated using PCU1 420 in Shader Core 330 and stored in Core Back End FIFO 390 are also input to Shader Back End 360 and depth displacements are applied to interpolated pixel depth values using PCU2 430.

In step 518, Shader Back End 360 uses the codewords to determine whether this is the last pass of the data through Shader 255 and, if so, in Step 520 Shader Back End 360 reads per pixel components from Core Back End FIFO 390 and triangle data from Triangle Memory 410 and computes interpolated pixel depth values using DPU 450. Interpolated pixel depth values are used by Clip 455 to clip pixels using near and far clipping planes and optionally clamp clipped pixel values to avoid discarding a partially clipped pixel. In step 522, Shader Back End 360 determines if "depth replace" is enabled according to the codewords and, if so, in step 548 Multiplexor 465 selects PCU2 430 calculated displaced pixel depth values as final pixel depth values to be output from Shader Back End 360 to Combiners 370. In step 524, Combiners 370 uses the codewords to determine whether this is the last pass of the data through Shader 255 and, if so, in step 526 Combiners 370 input final pixel depth values into Depth FIFO 475 that are later output to Raster Analyzer 265. In step 528, Raster Analyzer 265 receives final pixel depth values from Combiners 370 and performs near and far plane clipping with optional clamping. Raster Analyzer 265 optionally reads pixel depth values stored in Local Memory 240 corresponding the pixel (x, y) locations for final pixel depth values. Raster Analyzer 265 optionally performs a depth test function using read pixel depth values and final pixel depth values as specified by the codewords and generates a pass or fail result. If the depth test passes, final depth is written back to Local Memory via Memory Controller. If the depth test fails the final depth is discarded. In this example, final depth is displaced pixel depth values calculated in two passes where pixel depth displacements are computed during a first pass and interpolated pixel depth values are computed in a second pass from the coordinates of the geometry primitive and combined with pixel depth displacements.

In Example 5, depth values are computed in three passes to output a new depth value in Shader by following the sequence of steps described below. Programming Shader 255 in the configuration detailed in this example results in Shader 255 first calculating normal vectors for each pixel that are used in a second pass to displace interpolated pixel depth values. In the third pass u, v coordinates are interpolated and used to read data stored in Local Memory 240, e.g., depth displacements. The read map depth displacements are combined with calculated normal vector displaced depth during the third and final pass.

EXAMPLE 5

In step 510, Gate Keeper 320 receives pixel data, triangle data, and codewords from Rasterizer 250 and Shader Triangle Unit 310. Gate Keeper 320 stores triangle data in Triangle Memory 410 and outputs pixel data and codewords to Shader Core 330. In step 512, Shader Core 330 configures PCU1 420 according to the codewords and computes interpolated normal vectors based on data received from Gate Keeper 320. In step 514, Shader Core 330 writes per pixel normal vectors to Core Back End FIFO 390 to be used as source data in the second pass through Shader 255.

In step 516, Shader Core 330 uses the codewords to determine whether map data or program instructions to be executed at a later time are required to be read from Local Memory 240. The codewords are passed from Shader Core 330 through Texture 340 to Remap 350. If the program instructions are required to be read from Local Memory 240, in step 530 Shader Core 330 calculates the read addresses in Address Generator 425 and outputs a read request to Memory Controller 220. In step 534, read program instructions return to Texture 340 and are unpacked. In step 536, Remap 350 receives and processes the unpacked program instructions, generates codewords, and determines whether source data is required to be read from Quad Loop Back 356 and, if not, in step 542 Remap 350 outputs codewords to Shader Back End 360. In step 544, Shader Back End 360 configures PCU2 430 according to codewords to pass the data input to PCU2 430 through to the output of PCU2 430. In this example, per pixel normal vectors computed using PCU1 420 in Shader Core 330 and stored in Core Back End FIFO 390 are passed through PCU2 430. Alternatively, PCU2 430 is configured to compute modified normal vectors using source inputs such as read map data or pixel components read from Core Back End FIFO 390.

In step 518, Shader Back End 360 uses the codewords to determine whether this is the last pass of the data through Shader 255 and, if not, in step 522 Shader Back End 360 determines if "depth replace" is enabled according to the codewords. If "depth replace" is enabled, in step 548 Multiplexor 465 selects PCU2 430 calculated data and outputs it to Combiners 370. In step 524, Combiners 370 uses the codewords to determine whether this is the last pass of the data through Shader 255 and, if not, in step 550 Combiners inputs PCU2 430 processed data output from Shader Back End 360 into CCU 470 and feeds the output of CCU 470 into Gate Keeper 320. Codewords generated from program instructions are output by Combiners 370 to Gatekeeper 320. CCU 470 processed data, e.g., per pixel normal vectors, are written to Quad Loop Back 356 to be used during the second pass.

Example 5 continues with step 510 for a second pass, when Gate Keeper 320 receives and synchronizes the codewords received from Combiners 370 with pixel data from Rasterizer 250 and triangle data from Shader Triangle Unit 310 using Multiplexor 415 to output data received from each source as directed by codewords. In step 512, Shader Core 330 configures PCU1 420 according to the codewords and computes interpolated pixel depth values based on data received by Gate Keeper 320 from Rasterizer 250 and Shader Triangle Unit 310. In step 514, Shader Core 330 writes per pixel interpolated depth values to Core Back End FIFO 390 to be used as source data in the current pass through Shader 255.

In step 516, Shader Core 330 uses codewords to determine whether map data or program instructions to be executed at a later time are required to be read from Local Memory 240. The codewords are passed from Shader Core 330 through Texture 340 to Remap 350. If the map data or program instructions to be executed at a later time are not required to be read from Local Memory 240, in step 538 Remap 350 determines whether source data is required to be read from Quad Loop Back 356. If the source data stored in Quad Loop Back 356 is required to be read, in step 540 Remap 350 generates a read request for Quad Loop Back 356. In step 540, pixel normal vectors calculated during the first pass are received from Quad Loop Back 356 by Remap 350 and in step 542 Remap 350 format converts pixel normal vectors. The format converted pixel normal vectors are output by Remap 350 to Shader Back End 360. In step 544, Shader Back End 360 configures PCU2 430 according to the codewords to perform a computation. Interpolated pixel depth values calculated using PCU1 420 in Shader Core 330 and stored in Core Back End FIFO 390 are also input to Shader Back End 360 and PCU2 430 is configured to use format converted pixel normal vectors to displace interpolated pixel depth values.

In step 518, Shader Back End 360 uses the codewords to determine whether this is the last pass of the data through Shader 255 and, if not, in step 522 Shader Back End 360 determines if "depth replace" is enabled according to the codewords. If "depth replace" is enabled, in step 548 Multiplexor 465 selects PCU2 430 calculated normal vector displace interpolated pixel depth values to be output to Combiners 370 before proceeding to step 524. In step 524, Combiners 370 uses the codewords to determine whether this is the last pass of the data through Shader 255 and, if not, in step 550 Combiners inputs PCU2 calculated normal vector displaced interpolated pixel depth values output from Shader Back End 360 into CCU 470 and feeds the output of CCU 470 into Gate Keeper 320. Codewords generated from program instructions are output by Combiners 370 to Gatekeeper 320. CCU 470 processed data, e.g., calculated normal vector displace interpolated pixel depth values, are written to Quad Loop Back 356 to be used during the third pass.

Example 5 continues with step 510 for a third pass, when Gate Keeper 320 receives and synchronizes the codewords received from Combiners 370 with pixel data from Rasterizer 250 and triangle data from Shader Triangle Unit 310 using Multiplexor 415 to output data received from each source as directed by codewords. In step 512, Shader Core 330 configures PCU1 420 according to the codewords and computes interpolated map indices based on data received by Gate Keeper 320 from Rasterizer 250 and Shader Triangle Unit 310. In step 514, Shader Core 330 writes per pixel component data to Core Back End FIFO 390 to be used as source data in the current pass through Shader 255.

In step 516, Shader Core 330 uses the codewords to determine whether map data or program instructions to be executed at a later time are required to be read from local memory. The codewords are passed from Shader Core 330 through Texture 340 to Remap 350. If the map data or program instructions to be executed at a later time are required to be read from Local Memory 240, in step 530 Shader Core 330 calculates the read addresses in Address Generator 425 and outputs read requests to Memory Controller 220. In step 534, read depth map data values and read program instructions return to Texture 340 and are unpacked. In step 534, Remap 350 receives and processes the unpacked program instructions and in step 536 determines whether source data are required to be read from Quad Loop Back 356. If the source data stored in Quad Loop Back 356 is required to be read, in step 540 Remap 350 generates a read request for Quad Loop Back 356. In step 540, normal vector displaced interpolated pixel depth values, calculated during the second pass, are received from Quad Loop Back 356 by Remap 350. In step 542, Remap 350 format converts read depth displacements and displaced interpolated pixel depth values that were calculated during the second pass. Remap 350 outputs codewords, format converted read depth displacements, and format converted displaced interpolated pixel depth values. In step 544, PCU2 430 is configured to use format converted read depth displacements to further displace format converted displaced interpolated pixel depth values and generate displaced pixel depth values.

In step 518, Shader Back End 360 uses the codewords to determine whether this is the last pass of the data through Shader 255 and, if so, in Step 520 Shader Back End 360 reads per pixel components from Core Back End FIFO 390 and triangle data from Triangle Memory 410 and computes interpolated pixel depth values using DPU 450. Interpolated pixel depth values are used by Clip 455 to clip pixels using near and far clipping planes and optionally clamp clipped pixel values to avoid discarding a partially clipped pixel.

In step 522, Shader Back End 360 determines if "depth replace" is enabled according to the codewords and, if so, in step 548 Multiplexor 465 selects PCU2 430 calculated displaced pixel depth values as final pixel depth values to be output from Shader Back End 360 to Combiners 370. In step 524, Combiners 370 uses the codewords to determine whether this is the last pass of the data through Shader 255 and, if so, in step 526 Combiners 370 input final pixel depth values into Depth FIFO 475 that are later output to Raster Analyzer 265. In step 528, Raster Analyzer 265 receives final pixel depth values from Combiners 370 and performs near and far plane clipping with optional clamping. Raster Analyzer 265 optionally reads pixel depth values stored in Local Memory 240 corresponding the pixel (x, y) locations for final pixel depth values. Raster Analyzer 265 optionally performs a depth test function using read pixel depth values and final pixel depth values as specified by the codewords and generates a pass or fail result. If the depth test passes, final depth is written back to Local Memory via Memory Controller. If the depth test fails the final depth is discarded. In this example, final depth is displaced pixel depth that was generated using interpolated pixel depth values computed from the coordinates of the geometry primitive displaced by normal vectors and map data representing depth displacements.

In an alternate embodiment, final pixel depth values are calculated using pixel programs that instruct Shader 255 to process the data in more than three passes. In the preceeding examples several sources are input to PCU1 420 and PCU2 430 to generate final pixel depth, including, but not limited to interpolated pixel depth, data processed by the Programmable Computation Units in the pipeline (such as pixel normal vectors), data read from Local Memory 240, data read from or Host Memory 112, data processed by DPU 450 in the pipeline, data stored in Core Back End FIFO 390, and data stored in Quad Loop Back 356. Furthermore, depth values include interpolated pixel depth, indices used to read pixel depth, indices used to read vertex depth, and depth components, e.g., derivatives, differences, normal vectors, etc.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate my specific order for carrying out steps or other operations; the lettering is included to simplify referring to those elements.

What is claimed is:

1. A method of calculating a pixel depth value, comprising:
   a) selecting, under control of a pixel program, one or more inputs from a plurality of sources;
   b) computing a calculated pixel depth value in a programmable fragment processing pipeline, under control of the pixel program, using the selected one or more inputs, the calculated pixel depth value associated with a geometry primitive pixel and independent of the coordinates of the geometry primitive;
   c) writing the calculated pixel depth value to a local register file;
   d) computing a first interpolated pixel depth value associated with the geometry primitive pixel and dependent on the coordinates of the geometry primitive; and
   e) computing, under control of the pixel program, a second interpolated pixel depth value that is the same as the first interpolated pixel depth value.

2. The method of claim 1, further comprising the step of reading a value from the local register file, the read value being one of the one or more inputs from the plurality of sources.

3. The method of claim 1, further comprising the step of reading a value from a graphics memory, the read value being one of the one or more inputs from the plurality of sources.

4. The method of claim 1, wherein one of the one or more inputs from the plurality of sources is the result of a programmable computation in the programmable fragment processing pipeline.

5. The method of claim 1, further comprising the step of reading a value from a host memory, the read value being one of the one or more inputs from the plurality of sources.

6. The method of claim 1, further comprising the step of choosing, under control of the pixel program, between the calculated pixel depth value and the first interpolated pixel depth value to generate a final pixel depth value.

7. A method of calculating a pixel depth value, comprising:
   a) selecting, under control of a pixel program, one or more inputs from a plurality of sources;
   b) computing a calculated pixel depth value in a programmable fragment processing pipeline, under control of the pixel program, using the selected one or more inputs, the calculated pixel depth value associated with a geometry primitive pixel and independent of the coordinates of the geometry primitive;
   c) writing the calculated pixel depth value to a local register file;
   d) computing a first interpolated pixel depth value associated with the geometry primitive pixel and dependent on the coordinates of the geometry primitive;
   e) choosing, under control of the program, between the calculated pixel depth value and the first interpolated pixel depth value to generate a final pixel depth value; and
   f) clipping a pixel associated with the first interpolated pixel depth value and conditionally discarding the pixel based on a near clipping plane and a far clipping plane.

8. The method of claim 7, further comprising the step of clipping a pixel associated with the final pixel depth value based on the near clipping plane and the far plane using a second clipping unit.

9. The method of claim 8, further comprising the step of clamping the final pixel depth value.

10. The method of claim 7, further comprising the step of clamping the first interpolated pixel depth value.

11. A programmable fragment processing pipeline comprising:
    a) a local register file; and
    b) a programmable computation unit configured to select, under control of a pixel program, one or more inputs from a plurality of sources, the programmable computation unit comprising:
       i) one or more arithmetic units configured to compute, under control of the pixel program, a calculated pixel depth value using the one or more selected inputs, and an interpolated pixel depth value, wherein the calculated pixel depth value is associated with a geometry primitive pixel and independent of the coordinates of the geometry primitive, and the interpolated pixel depth value is associated with a geometry primitive pixel and dependent on the coordinates of the geometry primitive; and ii) a write interface configured to write the calculated pixel depth value to the local register file;

c) a depth processing unit configured to select, under control of the pixel program, one or more inputs for a pixel depth calculation, the depth processing unit comprising one or more arithmetic units configured to compute, under control of the pixel program, a first interpolated pixel depth value using the one or more selected inputs, the first interpolated pixel depth value associated with the geometry primitive pixel and dependent on the coordinates of the geometry primitive;

d) a selector configured to select, under control of the program, between the calculated pixel depth value and the interpolated pixel depth value to generate a final pixel depth value; and e) a second programmable computation unit configured to select, under control of a pixel program one or more inputs for a pixel depth calculation, the second programmable computation unit comprising:

i) one or more arithmetic units configured to compute, under control of the pixel program, an interpolated pixel depth value using the one or more selected inputs, the computed interpolated pixel depth value being the same as the interpolated pixel depth computed by the depth processing unit; and ii) a write interface configured to write the calculated pixel depth value to the local storage resource.

12. The programmable fragment processing pipeline of claim 11, further comprising a read interface configured to read a value from the local register file, the local register file being one of the plurality of sources.

13. The programmable fragment processing pipeline of claim 12, further comprising a second read interface configured to read a value from a graphics memory, the graphics memory being one of the plurality of sources.

14. The programmable fragment processing pipeline of claim 12, further comprising a second read interface configured to read a value from a host memory, the host memory being one of the plurality of sources.

15. The programmable fragment processing pipeline of claim 11, wherein the second programmable computation unit in the programmable fragment processing pipeline is one of the plurality of sources.

16. A programmable fragment processing pipeline comprising:

a) a local register file; and b) a programmable computation unit configured to select, under control of a pixel program, one or more inputs from a plurality of sources, the programmable computation unit comprising:

i) one or more arithmetic units configured to compute, under control of the pixel program, a calculated pixel depth value using the one or more selected inputs, and an interpolated pixel depth value, wherein the calculated pixel depth value is associated with a geometry pixel and independent of the coordinates of the geometry primitive, and the interpolated pixel depth value is associated with a geometry primitive pixel and dependent on the coordinates of the geometry primitive; and ii) a write interface configured to write the calculated pixel depth value to the local register file;

c) a depth processing unit configured to select, under control of the pixel program, one or more inputs for a pixel depth calculation, the depth processing unit comprising one or more arithmetic units configured to compute, under control of the pixel program, a first interpolated pixel depth value using the one or more selected inputs, the first interpolated pixel depth value associated with the geometry primitive pixel and dependent on the coordinates of the geometry primitive;

d) a selector configured to select, under control of the program, between the calculated pixel depth value and the interpolated pixel depth value to generate a final pixel depth value; and e) first clipping unit configured to clip a pixel associated with the interpolated pixel depth value and conditionally discard the pixel associated with the interpolated pixel depth value based on a near clipping plane and a far clipping plane.

17. The programmable fragment processing pipeline of claim 16, further comprising a second clipping unit configured to clip a pixel associated with the final pixel depth value and conditionally discard the pixel associated with the final pixel depth value based on the near clipping plane and the far clipping plane.

18. The programmable fragment processing pipeline of claim 17, wherein the second clipping unit is programmable to clamp the final pixel depth value.

19. The programmable fragment processing pipeline of claim 16, wherein the first clipping unit is programmable to clamp the interpolated pixel depth value.

* * * * *

UNITED STATES PATENT AND TRADEMARK OFFICE
CERTIFICATE OF CORRECTION

PATENT NO. : 6,864,893 B2
DATED : March 8, 2005
INVENTOR(S) : Harold Robert Feldmen Zatz It is certified that error appears in the above-identified patent and that said Letters Patent is hereby corrected as shown below:

<u>Title page,</u>
Item [57], ABSTRACT,
Line 5, replace "systems" with -- system --.
Line 7, replace "Th" with -- The --.

<u>Column 18,</u>
Line 13, insert the word -- primitive -- after the word, "geometry".

Signed and Sealed this

Fifth Day of July, 2005

JON W. DUDAS
*Director of the United States Patent and Trademark Office*